United States Patent
Bosio et al.

[11] Patent Number: 6,135,488
[45] Date of Patent: Oct. 24, 2000

[54] GAS BAG FOR A VEHICULAR RESTRAINT SYSTEM AND FABRIC FOR ITS MANUFACTURE

[75] Inventors: Allen C. Bosio, Aschaffenburg; Guido Walz, Welzheim, both of Germany

[73] Assignee: TRW Occupant Restraint Systems GmbH & Co. KG, Alfdorf, Germany

[21] Appl. No.: 09/111,153

[22] Filed: Jul. 7, 1998

[30] Foreign Application Priority Data

Jul. 7, 1997 [DE] Germany ............... 297 11 904 U

[51] Int. Cl.[7] .................................................. B60R 21/16
[52] U.S. Cl. .......................... 280/728.1; 280/743.1; 442/203; 442/136
[58] Field of Search ................... 280/743.1, 728.1; 442/301, 302, 203, 136

[56] References Cited

U.S. PATENT DOCUMENTS

| | | | |
|---|---|---|---|
| 3,792,873 | 2/1974 | Buchner et al. | 280/743.1 X |
| 3,960,386 | 6/1976 | Wallsten | 280/743.1 X |
| 3,970,328 | 7/1976 | Wallsten | 280/743.1 X |
| 4,092,453 | 5/1978 | Jonda | 442/203 |
| 4,359,501 | 11/1982 | DiTullio | 442/301 X |
| 4,963,412 | 10/1990 | Kokeguchi | 280/743.1 X |
| 5,100,168 | 3/1992 | Horiuchi et al. | 280/728.1 |
| 5,104,727 | 4/1992 | Wnenchak | 280/743.1 X |
| 5,131,434 | 7/1992 | Krummheuer et al. | 280/743.1 X |
| 5,236,775 | 8/1993 | Swoboda et al. | 280/728.1 X |
| 5,261,472 | 11/1993 | Knox et al. | 442/301 |
| 5,277,966 | 1/1994 | Nakayama et al. | 280/728.1 X |
| 5,401,566 | 3/1995 | Magee | 442/136 X |
| 5,407,728 | 4/1995 | Kerr et al. | 442/302 |
| 5,421,377 | 6/1995 | Bonigk | 442/203 |
| 5,441,798 | 8/1995 | Nishimura et al. | 280/728.1 X |
| 5,498,030 | 3/1996 | Hill et al. | 280/743.1 X |
| 5,505,485 | 4/1996 | Breed | 280/743.1 X |
| 5,518,269 | 5/1996 | Storey | 280/743.1 X |
| 5,581,856 | 12/1996 | Krummheuer et al. | 280/728.1 X |
| 5,693,392 | 12/1997 | Bergen et al. | 280/743.1 X |
| 5,702,795 | 12/1997 | Matsumoto et al. | 442/203 |
| 5,704,402 | 1/1998 | Bowen et al. | 280/728.1 X |
| 5,713,598 | 2/1998 | Morita et al. | 280/743.1 |
| 5,768,875 | 6/1998 | Bergen | 280/743.1 X |
| 5,826,489 | 10/1998 | Kuji | 442/203 |
| 5,827,996 | 10/1998 | Yoshida et al. | . |
| 5,836,611 | 11/1998 | Palm | 280/743.1 |
| 5,865,464 | 2/1999 | Kanuma et al. | 280/743.1 |
| 5,879,767 | 3/1999 | Matsushima et al. | . |

*Primary Examiner*—Lanna Mai
*Attorney, Agent, or Firm*—Tarolli, Sundheim, Covell, Tummino & Szabo L.L.P.

[57] ABSTRACT

The present invention relates to a gas bag for a vehicular restraint system, comprising a wall of a non-coated fabric, the wall having an inner surface facing away from a vehicle interior in an inflated condition of the gas bag, wherein a heat dissipating means is provided on the inner surface of the wall. In a preferred embodiment, the heat dissipating means consist of long floating plastic threads oriented in a weft or warp direction and interwoven with said fabric.

10 Claims, 1 Drawing Sheet

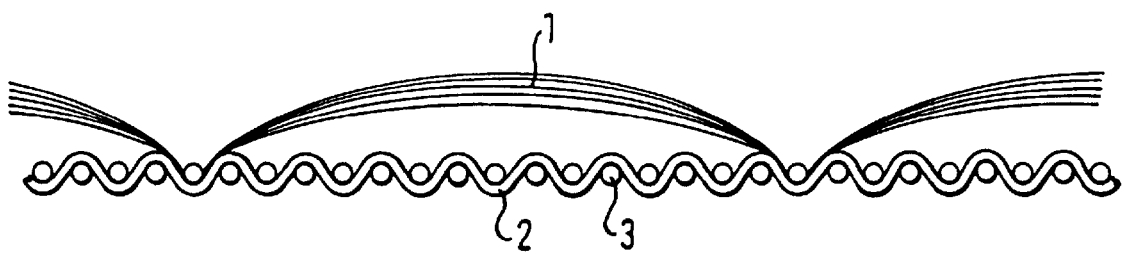

GAS BAG FOR A VEHICULAR RESTRAINT SYSTEM AND FABRIC FOR ITS MANUFACTURE

The invention relates to a gas bag for a vehicular restraint system, including a wall of non-coated fabric. Furthermore, the invention relates to a fabric for the manufacture of the gas bag.

BACKGROUND OF THE INVENTION

In avoiding the difficulties involved in conventional gas bag designs due to the use of polyamide fabrics coated with methyl rubber or silicones, non-coated textile fabrics according to a proposal in EP-A1-0454213 are employed for the production of gas bags. The necessary low gas permeability of the fabric can be achieved by densification, more particularly by shrinking, thermofixing and calendering the fabric. By employing low-shrinkage threads in the lower part of the gas bag and high-shrinkage threads in the upper part of the gas bag it can be achieved that after inflation of the gas bag the gas permeability of the lower part is greater than that of the upper part of the gas bag so that a defined escape of gas from the gas bag occurs on impact of the vehicle occupant.

EP-A1-0509399 describes a gas bag in which a gas-tight and a gas-discharging fabric part are provided, the gas-discharging fabric part being made of a fabric having a crepe or a modified barley-corn weave. This fabric consists preferably of a non-sized polyester yarn.

Furthermore, described in EP-A1-0599158 is a gas bag for vehicular restraint systems which consists of several fabric parts differing in gas permeability. All fabric parts of the gas bag are produced of a textile material of the same nature, more particularly having the same thread count, the gas permeability of the fabric being set in view of the stress ratio between the weft and warp threads when the gas bag is inflated and in view of the dynamic response of the gas permeability via the weave and the interweaving.

In the case of gas bags produced of a non-coated fabric as known hitherto there is, however, the risk of the hot gases released after the ignition of the propellant of a pyrotechnical inflator for inflating the gas bag as a result of a collision, resulting in damage to the gas bag fabric and thus changing the gas permeability thereof undesirably. In addition to this, the vehicle occupants are exposed to the risk of burn injuries due to the uncontrolled release of hot gases into the vehicle interior.

SUMMARY OF THE INVENTION

According to the invention, a gas bag of the aforementioned kind is thus provided for a vehicular restraint system which is characterized by a heat dissipating means being provided, in the inflated condition of the gas bag, on the inner surface of the wall facing away from the vehicle interior. This heat dissipating means is subjected to a physical or chemical change of its aggregate condition or its structure accompanied by consumption of heat when coming into contact with the hot gases, as a result of which the temperature of the gases is reduced before the gases come into contact with the non-coated fabric material of the gas bag. A further subject matter of the invention is also a non-coated fabric for the production of a gas bag for vehicular restraint systems which comprises a heat dissipating means on one of its faces.

The heat dissipating means consists more particularly preferred of long floating plastic threads interwoven in the weft or warp direction with the gas bag fabric. Weaving is done preferably at a spacing of approximately one cm. The long floating plastic threads are provided preferably in a thread count of approximately 4 to 6 threads per cm. The plastic threads consist, more preferably, of polyamide having a melting point of 180 to 440° C., preferably 180 to 260° C.

According to a further embodiment of the invention the heat dissipating means consists of sodium hydrocarbonate powder applied on the inner surface of the gas bag wall by dusting. Due to the effect of the hot gases, the sodium hydrogen carbonate powder decomposes forming carbon dioxide as of a temperature of approximately 180° C. However, any other powder decomposing into non-toxic components at a comparable temperature may also be employed.

The invention will now be described in more detail on the basis of a preferred embodiment, with reference being made to the drawings, which is not intended to be appreciated in any restrictive sense, however.

BRIEF DESCRIPTION OF THE DRAWINGS

The drawings shows a sectional view of a gas bag fabric according to the invention.

DESCRIPTION OF PREFERRED EMBODIMENTS

The gas bag according to the invention is formed preferably of several fabric parts differing in their gas permeability. The fabric is non-coated and comprises preferably a plain weave. However, the crepe or modified barley corn weave as described in EP-A1-0509399 may also be employed. The fabric threads consist preferably of polyamide or polyester. The thread count and further fabric parameters such as e.g. the single titer of the multi-filament yarn employed as well as the total titer thereof are selected such that the desired gas permeability materializes.

In the embodiment shown in the drawing, long floating plastic threads 1 are oriented in the weft or warp direction on the inner surface of the gas bag wall, i.e. on the face of gas bag fabric facing away from the interior of the vehicle, in the inflated condition of the gas bag. The long floating threads 1 consist of a material, preferably polyamide, the melting point of which is in the range of 180 to 440° C., preferably between 180 and 260° C. The same material as used for producing the non-coated gas bag fabric may be used, or a material differing therefrom. Each of the long floating threads 1 is formed preferably of a non-twisted multi-filament yarn having a single titer of less than 4 dtex and a total titer of up to 550 dtex. The threads 1 are oriented preferably in the direction of the weft threads 2 and are tied to the warp threads 3 at a spacing of approximately one cm. The thread count of the long floating threads is approximately 4 to 6 threads per cm.

Producing the fabric as described above is done by a known weaving method on known looms. The fabric thus produced is cut to size and stitched together so as to form the desired gas bag. Both cylindrical gas bags consisting of a shell part and an upper and a lower part as well as cushion- or balloon-shaped gas bags consisting of only two fabric parts may be produced.

The gas bag according to the invention is a component of a vehicle occupant restraint system. When involved in a collision, the restraint system is activated by ignition of the propellant of an inflator. The hot gases released thereby which may attain a temperature of up to 1400 K are filtered and inflate the gas bag within a few milliseconds. The long floating plastic threads incorporated in the gas bag offer the hot gases a larger contact surface than the inner surface of the gas bag wall and thus begin to melt before the threads of the non-coated fabric. In this respect it is particularly advantageous to employ plastic threads of a material, the melting point of which is lower than the melting point of the fabric material, and/or to employ non-twisted multi-filament yarns by which the contact surface can be additionally increased. Due to the melting process, heat is taken away from the hot gas, thus reducing the gas temperature, as a result of which damage to the remaining fabric material can be effectively prevented.

According to a further embodiment of the invention, the inner surface of the gas bag formed of a non-coated fabric is dusted with a sodium hydrocarbonate powder. The powder physically tacks to the fabric threads and forms a means for dissipating heat. When coming into contact with the hot gases generated to inflate the gas bag, the sodium hydrocarbonate powder decomposes into soda, water and gaseous carbon dioxide. The heating energy needed for this decomposition is thus taken away from the hot gases, resulting in a cooling thereof. Accordingly, the risk of the non-coated gas bag fabric being damaged by the hot gases is substantially reduced. Instead of sodium hydrogen carbonate, ammonium hydrocarbonate, commercial ammonium carbonate or potassium bicarbonate may be employed, for example.

What is claimed is:

1. A gas bag for a vehicular restraint system, comprising:
   a wall of non-coated fabric, the wall having an inner surface facing away from a vehicle interior in an inflated condition of the gas bag, the inner surface defining a volume which receives gas for inflating the gas bag, and
   a heat dissipating means on the inner surface of the wall, said heat dissipating means reducing the temperature of gas streaming into the gas bag upon inflation of the gas bag by melting due to the heat dissipating means being heated by the gas,
   wherein said heat dissipating means consists of long floating plastic threads oriented in a weft or warp direction and interwoven with said fabric at predetermined locations, and said long floating plastic threads being spaced apart from said inner surface of said fabric between said predetermined locations.

2. The gas bag as set forth in claim 1, wherein said plastic threads exist in a thread count of 4 to 6 threads per cm.

3. The gas bag as set forth in claim 1, wherein said plastic threads are interwoven at predetermined locations in a spacing of about 1 cm.

4. The gas bag as set forth in claim 1, wherein said plastic threads consist of polyamide having a melting point of about 180 to 440° C.

5. A gas bag for a vehicular restraint system, comprising:
   a wall of non-coated fabric, the wall having an inner surface facing away from a vehicle interior in an inflated condition of the gas bag, the inner surface defining a volume which receives gas for inflating the gas bag, and
   a heat dissipating means on the inner surface of the wall, said heat dissipating means reducing the temperature of gas streaming into the gas bag upon inflation of the gas bag by melting due to the heat dissipating means being heated by the gas,
   wherein said heat dissipating means is selected from the group consisting of sodium hydrocarbonate, ammonium hydrocarbonate, ammonium carbonate or potassium bicarbonate, and is dusted on the inner surface of said fabric.

6. A fabric for producing a gas bag for a vehicular restraint system, which gas bag is inflated by a gas directed into the gas bag, the fabric comprising an outer surface and an inner surface opposite to said outer surface, said inner surface being to define an inflatable volume of the gas bag, and
   a heat dissipating means provided on said inner surface of said fabric, said heat dissipating means reducing the temperature of gas streaming into the gas bag upon inflation of the gas bag by melting due to the heat dissipating means being heated by the gas,
   wherein said heat dissipating means consists of long floating plastic threads oriented in a weft or warp direction and interwoven with said fabric at predetermined locations, and said long floating plastic threads being spaced apart from said inner surface between said predetermined locations.

7. The fabric as set forth in claim 6, wherein said plastic threads are provided in a thread count of 4 to 6 cm.

8. The gas bag as set forth in claim 6, wherein said plastic threads are interwoven at said predetermined locations in a spacing of about 1 cm.

9. The gas bag as set forth in claim 6, wherein said plastic threads consist of polyamide having a melting point of about 180 to 440° C.

10. A fabric for producing a gas bag for a vehicular restraint system, which gas bag is inflated by a gas directed into the gas bag, the fabric comprising an outer surface and an inner surface opposite to said outer surface, said inner surface being to define an inflatable volume of the gas bag, and
    a heat dissipating means provided on said inner surface of said fabric, said heat dissipating means reducing the temperature of gas streaming into the gas bag by melting due to the heat dissipating means being heated by the gas,
    wherein said heat dissipating means is selected from the group consisting of sodium hydrocarbonate, ammonium hydrocarbonate, ammonium carbonate or potassium bicarbonate, and is dusted on the inner surface of said fabric.

* * * * *